Patented July 6, 1937

2,086,399

UNITED STATES PATENT OFFICE 2,086,399

LUBRICATING OIL

Charles C. Towne, Beacon, N. Y., assignor to The Texas Company, New York, N. Y., a corporation of New York No Drawing. Application May 31, 1935,
Serial No. 24,350

6 Claims. (Cl. 87—9)

This invention relates to the manufacture of lubricating oils, and particularly to mineral lubricating oils of improved character having an increased viscosity index and/or lowered pour point.

In my co-pending application, Serial No. 738,294, filed August 3, 1934, I have disclosed a material for increasing the viscosity index or lowering the pour point of a mineral lubricating oil, which is a synthetic resin produced as a reaction product of rubber with certain amphoteric metallic halides or halogen acids. While the material disclosed in the above mentioned application is eminently satisfactory for the purposes intended, the color and appearance of a pale lubricating oil may be affected to a certain extent, and carbon residue, ash content and oxidizability of the oil measurably increased.

These objections are overcome in accordance with the present invention by treating the resinous reaction product to separate a purified material which gives a pale clear solution in a pale lubricating oil, while at the same time the carbon residue and oxidation stability of the treated oil are greatly improved and the ash content is negligible. This is accomplished by forming a solution of the resinous reaction product in an aromatic hydrocarbon of the character of benzol, then adding an anhydrous acid to the solution which causes precipitation of undesirable material. The precipitate is settled from the solution of desirable material; and then a precipitating solvent of the character of ketones and alcohols is added to precipitate the desired material from the solution, to thereby obtain it in a purified form. This precipitated material may be recovered by filtration or decantation, and then redissolved in an aromatic solvent to form a concentrated solution which may be added to a mineral lubricating oil to improve the character of the latter. It may also be dissolved directly in oil.

The particular type of resin contemplated herein is that produced when anhydrous solutions of rubber are treated with halide salts of amphoteric metals possessing residual or so-called secondary valences, such as stannic chloride or bromide, titanium tetrachloride, and boron trichloride, and the like, or when solid rubber is worked on a rubber mill with the same compounds, as described in U. S. Patent to Bruson, No. 1,846,247; or when boron fluoride or fluoroboric acid, produced as the reaction product of hydrofluoric acid with boric acid or metal salts of boric acid, are added directly to rubber and worked on a rubber mill at elevated temperatures to yield thermoplastic, moldable conversion products, or when the reaction product is added to a solution of rubber in benzene or other rubber solvent, as described in U. S. Patent to Bruson, No. 1,853,334; or when halogenated acids of tin, such as chlorostannic acid or chlorostannous acid or the corresponding brom-acids, are reacted with rubber, as by addition of approximately 10% of the reagent to rubber on a rubber mill, or to a solution of rubber in benzene or other rubber solvent, as described in U. S. Patent to Bruson, No. 1,797,188. Specifically, the moldable thermoplastic resin which is now commercialized by the Goodyear Tire and Rubber Company under the trade name "Plioform" constitutes a very satisfactory material of this character. This resin varies in character from a balata-like substance to an exceedingly hard material resembling ebonite depending upon the reagents and proportions thereof employed. The characteristics of resins of this character are described by Theis and Clifford in J. I. E. C. 26, 123. The products contain a certain amount of bound chlorine or halogen, depending upon the temperature and the proportions of the ingredients. They are soluble in benzene or other rubber solvents. They are softened upon the application of heat and may be molded. Typical properties of the resin have been determined as follows:

| | |
|---|---|
| Specific gravity | 1.06 |
| Odor | None |
| Taste | None |
| Softening point, °F.: | |
| No. 20 Plioform | 220 |
| No. 40 Plioform | 175–195 |
| Molding temp., °F.: | |
| No. 20 Plioform | 310 |
| No. 40 Plioform | 260 |
| Coefficient of thermal expansion | 0.00008 |
| Resistance to discoloration by light | Good |
| Surface resistivity (ohms per linear in.): | |
| At 90% relative humidity | $1 \times 10^{11}$ |
| At 75% relative humidity | $1 \times 10^{12}$ |
| Tensile strength, lb./sq. in. | 4000–5000 |
| Compressive strength, lb./sq. in. | 8500–11000 |
| Flexural strength, lb./sq. in. | 7000–9000 |
| Water absorption (24-hr. immersion) % | 0.03 |
| Resistance to concd. acid | Good |
| Resistance to strong alkali | Good |

In accordance with the present invention, the resinous reaction product is dissolved in an aromatic solvent of the character of benzol, toluene or xylene. The solution of the reaction product contains the active ingredients which are desired, as well as some material which imparts a dark cloudy appearance to the oil and has other objectionable properties. A limited quantity of an anhydrous acid of the character of glacial acetic acid, or an anhydrous mineral acid such as hydrochloric acid, is then added to the solution. This is found to precipitate undesirable darkening material, while leaving the desired highly active ingredients in solution. The precipitate is then separated and a precipitation solvent is subsequently added to the clear solution to precipitate the desired active ingredients of the resin. Ketones such as acetone and methyl ethyl ketone, and alcohols such as ethyl alcohol, are very satisfactory for this purpose. The precipitate of desired active material is then separated, washed if desired with the alcohol or ketone used for precipitation, and the material may then be taken up in solution in an aromatic solvent of the character of benzol to form a concentrate adapted to be added directly to lubricating oil.

As a specific example of the present invention, 200 grams of a plioform resin obtained in the manner described above was dissolved in commercial benzol (90%) and made up to a total volume of 8000 cc. During vigorous agitation at room temperature, 600 to 900 cc. of glacial acetic acid were added. A dark colored precipitate was obtained which contained substantially all of the impurities. This was allowed to settle and the clarified liquid containing the purified active ingredients in solution was decanted. 3000 cc. of acetone were then added to the clear solution, which precipitated the active ingredients almost quantitatively as a white or straw colored gummy mass. The supernatent liquid was decanted, and the separated purified material taken up in benzol to form a clear solution.

This concentrate may be added directly to lubricating oil, and the benzol then stripped off, leaving a solution of the active purified resin in oil which may be compounded to the desired viscosity. In other words, a concentrate of the active material is thus formed in mineral lubricating oil, which is adapted to be added to untreated lubricating oil to give a resulting compounded oil containing the desired proportion of the active material separated from the original resin. For example, to increase the viscosity index, a proportion of active material may be employed which is equivalent to that extracted and separated from a resinous reaction product weighing from 0.5–5% on the weight of the oil treated. This has been found to give an increase in viscosity index of a naphthene base oil of as much as 50–80 points, and of a paraffin base or mixed base oil of as much as 25–40 points. The addition of purified material of the character described above to partially dewaxed paraffin base or mixed base lubricating oils is also found advantageous in reducing the pour point thereof, in addition to increasing the viscosity index. For example, the addition of purified material extracted from resinous reaction product weighing from about 0.25% to 1.5% on the weight of the oil treated is found to lower the pour point about 10 to 20° F. Valuable lubricating oils of the character of rocker arm lubricant and similar improved lubricants can be produced by the addition of somewhat higher percentages of the purified resin of the present invention to lubricating oils. For example, the addition of purified material extracted from a weight of resinous reaction product equivalent to about 5–40% on the weight of the oil treated, is found to give a highly effective lubricant of this character. A very satisfactory gear lubricant may be produced in this manner.

In addition to the superior effectiveness of the material of the present invention in increasing viscosity index, the appearance of the oil to which it is added is not objectionably altered. The material also does not objectionably affect very desirable properties of lubricating oils, including carbon residue and oxidation stability, and the ash content of the treated oil is negligible.

The improved character of the purified material of the present invention over the unpurified resinous reaction product is illustrated by the following data. On a blend of furfural refined Mid-Continent lubricating oil containing 58.7% of SAE 10, 39.36% of SAE 20 and 1.94% of unpurified plioform resin, the following tests were obtained:

| | |
|---|---|
| Appearance | Dark, cloudy |
| Saybolt Universal vis. at 210° F | 60 |
| Viscosity index (D. & D.) | 110 |
| Carbon residue, % | 0.13 |
| Sligh oxidation number | 22 |
| Clarke oxidation bomb, pressure drop, lbs. | 98 |
| Precipitation number | 0.24 |
| Ash, % | 0.07 |

On the same blend of oils, containing purified material extracted from approximately 2% by weight of plioform resin, the following tests were obtained:

| | |
|---|---|
| Appearance | Clear |
| Saybolt Universal vis. at 210° F | 62 |
| Viscosity index (D. & D.) | 111 |
| Carbon residue, % | 0.02 |
| Sligh oxidation number | 13 |
| Clarke oxidation bomb, pressure drop, lbs. | 53 |
| Precipitation number | 0.07 |
| Ash, % | Trace |

Obviously many modifications and variations of the invention, as hereinbefore set forth, may be made without departing from the spirit and scope thereof and therefore only such limitations should be imposed as are indicated in the appended claims.

I claim:

1. In the manufacture of an improved mineral lubricating oil by addition of a material from a synthetic resinous product consisting essentially of a reaction product of rubber with a compound selected from the group consisting of amphoteric metal halides and halogen acids, the method which comprises dissolving the resinous product in an aromatic hydrocarbon, adding an anhydrous acid to the aromatic solution to precipitate undesirable material therefrom, separating a solution of the desired material from the precipitate, and adding separated material to a mineral lubricating oil in a proportion to improve the viscosity index of said oil.

2. In the manufacture of an improved mineral lubricating oil by the addition of material from a synthetic resinous product consisting essentially of a reaction product of rubber with a compound selected from the group consisting of amphoteric metal halides and halogen acids, the method which comprises dissolving the resinous product in an aromatic hydrocarbon, adding an anhydrous acid to the aromatic solution to precipitate undesirable material therefrom, separating a solution of the desired material from the precipitate, adding a solvent selected from the group consisting of ketones and alcohols to precipitate the desired material from the solution, and adding desired precipitated material to a mineral lubricating oil in a proportion to improve the viscosity index of said oil.

3. In the manufacture of an improved mineral lubricating oil by the addition of material from a synthetic resinous product of the reaction of rubber with a compound selected from the group consisting of amphoteric metal halides and halogen acids, the method which comprises dissolving the resin in an aromatic hydrocarbon of the character of benzol, adding an anhydrous acid selected from the group consisting of anhydrous mineral acids and glacial acetic acid to the aromatic solution to precipitate undesirable material therefrom, separating a solution of the desired material from the precipitate, then adding a solvent selected from the group consisting of ketones and alcohols to precipitate the desired material from the solution, and adding desired precipitated material to a mineral lubricating oil in a proportion to improve the viscosity index of said oil.

4. In the manufacture of an improved mineral lubricating oil by the addition of material from a synthetic resinous product of the reaction of rubber with a compound selected from the group consisting of amphoteric metal halides and halogen acids, the method which comprises dissolving the resin in benzol, adding glacial acetic acid to the benzol solution to precipitate undesirable material therefrom, separating the resultant solution from the precipitate, adding acetone to the separated solution to precipitate the desired active material therefrom, separating the precipitated active material, forming a concentrate thereof, and adding the concentrate to a mineral lubricating oil in a proportion to improve the viscosity index of the oil.

5. In the manufacture of an improved mineral lubricating oil, the method which comprises reacting rubber with stannic chloride to produce a resinous reaction product, dissolving the resinous reaction product in an aromatic hydrocarbon, adding an anhydrous acid to the aromatic solution to precipitate undesirable material therefrom, separating a solution of the desired material from the precipitate, and adding separated desired material to a mineral lubricating oil in a proportion to improve the viscosity index of the oil.

6. In the manufacture of an improved mineral lubricating oil, the method which comprises reacting rubber with stannic chloride to produce a resinous reaction product, dissolving the resinous reaction product in an aromatic hydrocarbon of the character of benzol, adding an anhydrous acid selected from the group consisting of anhydrous mineral acids and glacial acetic acid to the aromatic solution to precipitate undesirable material therefrom, separating a solution of the desired material from the precipitate, adding a solvent selected from the group consisting of ketones and alcohols to precipitate desired material from the solution, and adding desired precipitated material to a mineral lubricating oil in a proportion to improve the viscosity index of the oil.

CHARLES C. TOWNE.